United States Patent [19]

Arai et al.

[11] Patent Number: 4,834,349
[45] Date of Patent: * May 30, 1989

[54] VIBRATION PREVENTING APPARATUS USING FLUID

[75] Inventors: Katsuyoshi Arai; Toru Sasaki, both of Wako, Japan

[73] Assignee: Honda Giken Kogyo Kabushiki Kaisha, Tokyo, Japan

[*] Notice: The portion of the term of this patent subsequent to Oct. 13, 2004 has been disclaimed.

[21] Appl. No.: 60,295

[22] Filed: Jun. 10, 1987

[30] Foreign Application Priority Data

Jun. 12, 1986 [JP] Japan .................. 61-134831

[51] Int. Cl.$^4$ .................. F16M 7/00; B62D 21/11
[52] U.S. Cl. .................. 267/140.1; 267/219; 180/312
[58] Field of Search .................. 267/140.1, 35, 217, 267/218, 219, 220, 259, 136; 248/636, 562; 180/300, 312

[56] References Cited

U.S. PATENT DOCUMENTS

| 4,641,808 | 2/1987 | Flower .................. 267/140.1 X |
| 4,681,306 | 7/1987 | Hofmann et al. .................. 267/140.1 |
| 4,699,099 | 10/1987 | Arai et al. .................. 180/312 X |

FOREIGN PATENT DOCUMENTS

| 0154268 | 9/1985 | European Pat. Off. .................. 248/562 |
| 0155646 | 9/1985 | European Pat. Off. . |
| 0173273 | 3/1986 | European Pat. Off. . |
| 0192371 | 8/1986 | European Pat. Off. . |
| 3508823 | 9/1988 | Fed. Rep. of Germany . |
| 2574031 | 12/1985 | France . |
| 0117930 | 7/1984 | Japan .................. 267/140.1 |
| 0073146 | 4/1985 | Japan .................. 267/140.1 |
| 60-73146 | 4/1985 | Japan . |
| 61-55426 | 3/1986 | Japan . |

Primary Examiner—Andres Kashnikow
Assistant Examiner—Richard Potosnak
Attorney, Agent, or Firm—Armstrong, Nikaido, Marmelstein, Kubovcik & Murray

[57] ABSTRACT

A vibration preventing apparatus using fluid includes a main and an auxiliary fluid chamber in which fluid is confined. The main and auxiliary fluid chambers are communicated to each other by three kinds of orifices which exert different degrees of resistance to the flow of fluid. Two of such orifices which are smaller in resistance than the other are opened and closed independently of each other. The main fluid chamber is partly defined by an elastic member which supports a vibrating body. On vibration of the vibrating member, the volume of the main fluid chamber is varied to displace the fluid through any of the orifices. The particular orifices through which the fluid is to flow are determined based on the instantaneous vibration, whereby the vibration is absorbed effectively.

8 Claims, 5 Drawing Sheets

VIBRATION PREVENTING APPARATUS USING FLUID

BACKGROUND OF THE INVENTION

The present invention relates to a vibration preventing apparatus for supporting a vibrating body in a vibration-proof configuration and, more particularly, to a vibration preventing apparatus of the type which absorbs vibrations by using the elasticity of an elastic member and the displacement of fluid confined in the apparatus. The apparatus to which the present invention pertains may be, but not limited to, an engine mount for a motor vehicle.

In a motor vehicle, for example, vibrations which greatly differ in frequency and amplitude from each other are developed depending upon the operating conditions of the vehicle, e.g. engine speed. A motor vehicle, therefore, should be furnished with a vibration preventing apparatus capable of absorbing a wide range of vibrations.

Vibration preventing apparatus heretofore proposed include one which uses fluid. Specifically, a fluid type vibration preventing apparatus is provided with a main fluid chamber at least partly defined by an elastic member such as a cushion rubber and variable in volume responsive to vibrations of a vibrating body, and an auxiliary fluid chamber communicated to the main fluid chamber through an orifice. Non-compressible fluid such as operating oil is confined in the main and auxiliary fluid chambers. The volume of the auxiliary fluid chamber is easily variable as the fluid flows into and out of the main fluid chamber due to changes in the volume of the same chamber.

The above-described type of vibration preventing apparatus absorbs vibrations having high frequencies and small amplitudes due to the elastic deformation of the elastic member, and damps vibrations having low frequencies and large amplitudes due to the resistance to the fluid which flows through the orifice. Consequently, vibrations of different frequencies and amplitudes are absorbed.

A problem with the fluid type vibration preventing apparatus is that it cannot absorb a sufficiently wide range of vibrations so long as the orifice is implemented with a single fixed orifice. Specifically, with regard to vibrations of high frequencies and small amplitudes, they cannot be effectively absorbed unless an orifice having a large diameter is provided to reduce the resistance to the flow of fluid and, thereby, the dynamic spring constant. On the other hand, with regard to vibrations of low frequencies and large amplitudes, what is necessary for them to be effectively absorbed is providing an orifice having a small diameter to increase the resistance to the flow of fluid and, thereby, the damping force. A single fixed orifice is incapable of settling such a dilemmatic situation, limiting the range of absorbable vibrations.

In the light of the above, there has been proposed a fluid type vibration preventing apparatus in which a main and an auxiliary fluid chamber are communicated to each other by two orifices which apply different degrees of resistance, as disclosed in Japanese Patent Laid-Open Publication (Kokai) No. 60-113832/1985. One of the two orifices exerting smaller resistance than the other is controlled to open and close depending on the operating conditions of a motor vehicle. Such an apparatus is elaborated for application to a vehicle engine mount and others which have to absorb a wide range of vibrations.

However, in a motor vehicle, for example, there occur a shake and other vibrations having considerably great amplitudes in addition to the previously stated high-frequency small-amplitude vibrations particular to a high-speed engine operating condition and low-frequency large-amplitude vibrations particular to an idling condition. It is desirable, therefore, that an engine mount for a motor vehicle be capable of absorbing all of such vibrations. The prior art apparatus having two different kinds of orifices fails to cope with all kinds of vibrations as stated above.

Another prior art fluid type vibration preventing apparatus is provided with a plurality of identical orifices which are opened and closed independently of each other, as disclosed in Japanese Patent Laid-Open Publication (Kokai) No. 60-113834/1985. In this kind of apparatus, the flow rate of fluid being moved between fluid chambers is changed by controlling the number of orifices which are open. However, the effect attainable with such a scheme is nothing less than the one attainable with a single orifice whose effective sectional area is variable, i.e., it is difficult to accommodate vibrations of various natures.

SUMMARY OF THE INVENTION

It is therefore an object of the present invention to provide a fluid type oscillation preventing apparatus capable of absorbing a wide range of vibrations which are greatly different in frequency and amplitude from each other.

It is another object of the present invention to provide a fluid type oscillation preventing apparatus having a small dynamic spring constant.

It is another object of the present invention to provide an engine mount for a motor vehicle which exhibits a desirable vibration absorbing characteristics in both of an idling and a high-speed range of an engine and, in addition, surely damps even a shake and other vibrations having considerably great amplitudes.

In order to achieve the above objects, in accordance with the present invention, a main and an auxiliary fluid chamber are communicated to each other by three kinds of orifices which exert different degrees of resistance to a fluid flow, i.e., a first orifice exerting large resistance, a second orifice exerting smaller resistance than the first orifice, and a third orifice exerting a smaller resistance than the second orifice. The second orifice the resistance of which is medium and the third orifice the resistance of which is smallest are opened and closed, respectively, by a first and a second control device independently of each other.

In the above construction, the first orifice is configured to adequately absorb a shake and other vibrations having considerable amplitudes, the second orifice to adequately absorb low-frequency large-amplitude vibrations which occur during idling, and the third orifice to adequately absorb high-frequency small amplitude vibrations which occur during high-speed engine operation. Then on the occurrence of a shake or the like, the second and third orifices are closed so that the fluid is moved through the first orifice only, exerting a significant damping force. When only the third orifice is closed, the fluid is allowed to flow through the second orifice absorbing low-frequency large-amplitude vibrations. Further, when the third orifice is opened, the fluid is caused to flow through the third orifice whose resistance is very small, whereby high-frequency small-amplitude vibrations are absorbed effectively.

In a preferred embodiment of the present invention, the first orifice comprises a fixed orifice having a small sectional area and a substantial length, the second orifice an orifice which is greater in sectional area than the first orifice and variable in length, and the third orifice an orifice having a sufficiently great and variable effective sectional area.

The three kinds of orifices having different natures are capable of meeting a variety of demands such as for a great damping force and an increase in the mass of fluid which exists in an orifice portion. This allows the dynamic spring constant of a fluid type vibration preventing apparatus to be reduced.

BRIEF DESCRIPTION OF THE DRAWINGS

The above and other objects, features and advantages of the present invention will become more apparent from the following detailed description taken with the accompanying drawings in which.

DETAILED DESCRIPTION OF THE PREFERRED EMBODIMENT

Figure 1:
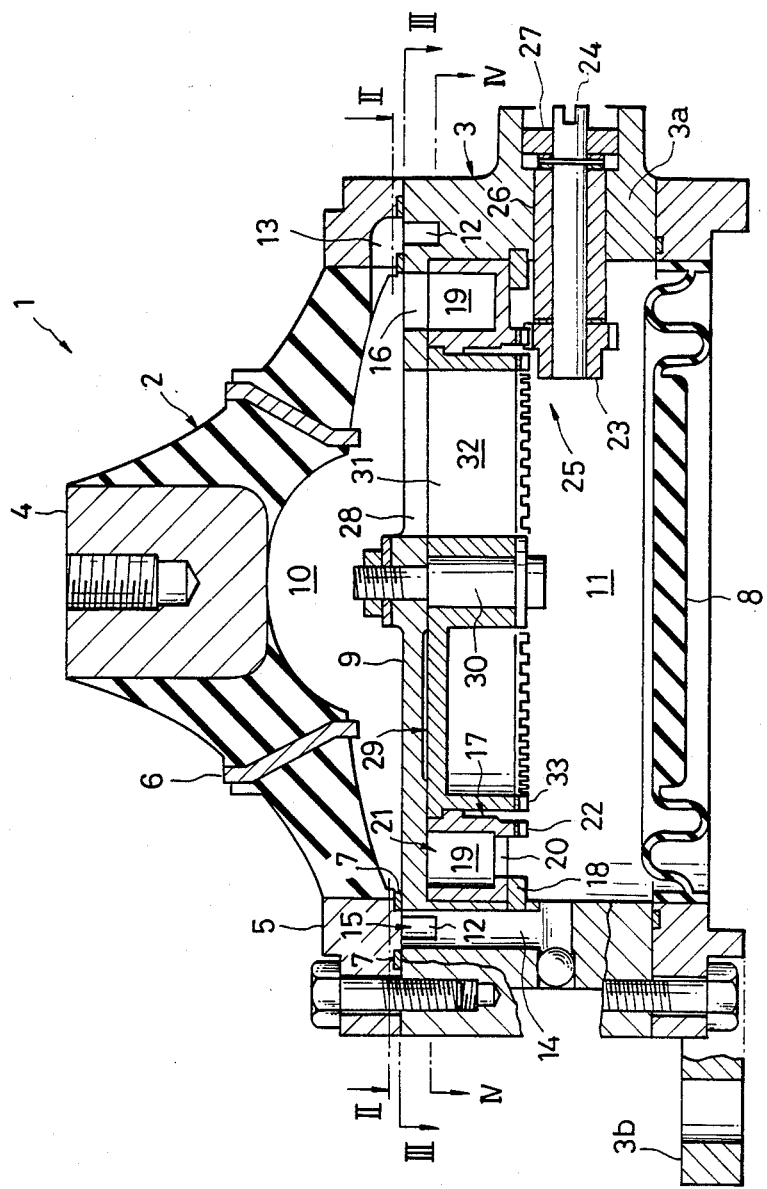
FIG. 1 is a vertical section showing an engine mount for a motor vehicle which is representative of a vibration preventing apparatus embodying the present invention.

Referring to FIG. 1 of the drawings, an engine mount, generally 1, includes an elastic member 2 made of rubber and provided with a hollow conic and relatively thick configuration, and a cylindrical housing 3 made of metal, plastic or like rigid material and open at its lower end. A mounting member 4 for mounting an engine, or vibrating body, is adhered to the upper end of the elastic member 2 by vulcanization. An annular flange member 5 is adhered to the lower end of the elastic member 2 by vulcanization, the elastic member 2 being connected to the housing 3 through the flange member 5. The housing 3 is fixed to the frame of a vehicle body, or supporting body, through a bracket 3b which is provided at the lower end of the housing 3. In such a structure, the elastic member 2 serves to interconnect the mounting member 4 provided on the vibrating body side and the mounting member provided on the vehicle frame side, i.e. flange member 5. The elastic member 2 is elastically deformable responsive to vibrations of the engine. A generally annular reinforcing member 6 is provided in an intermediate portion of the elastic member 2.

A radially inner and a radially outer seal members 7 and 7 are provided on the underside of the annular flange member 5 so as to set up fluid-tight sealing between the flange member 5 and the housing 3. The bottom of the housing 3 is closed in a fluid-tight manner by a thin flexible diaphragm 8 which is made of rubber. The elastic member 2, housing 3 and diaphragm 8 cooperate to define a fluid-tight bore in the engine mount 1. The bore is divided into an upper or main fluid chamber 10 and a lower or auxiliary fluid chamber 11 by a partition 9 which is constituted by an upper wall of the housing 3. Partly defined by the elastic member 2, the main fluid chamber 10 is variable in volume when the elastic member 2 is deformed by engine vibrations. On the other hand, the volume of the auxiliary fluid chamber 11 is readily variable in response to deformations of the diaphragm 8. Non-compressible hydraulic fluid such as operating oil or water is filled in the main and auxiliary fluid chambers 10 and 11.

Figure 2:
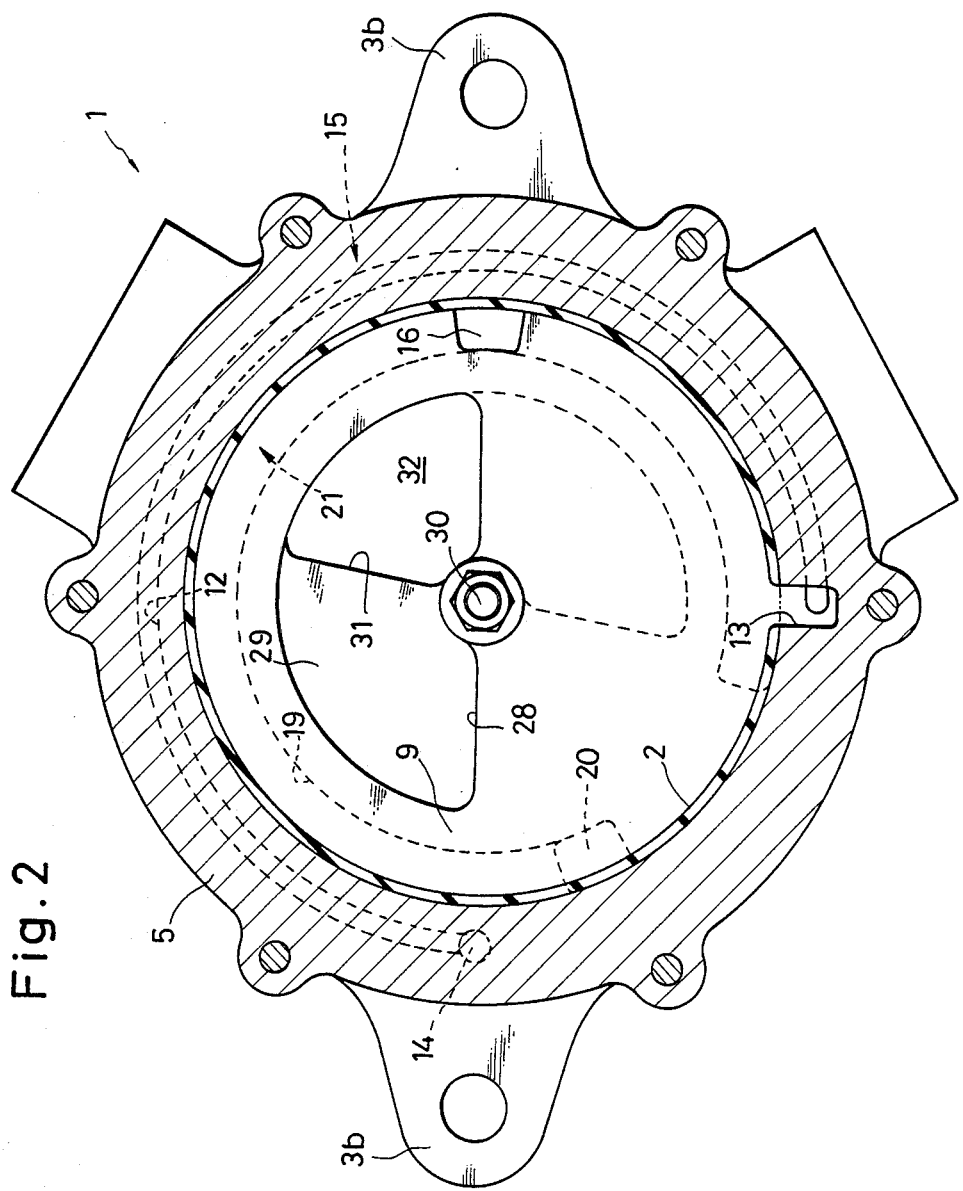
FIG. 2 is a horizontal section along line II—II of FIG. 1.
Figure 3:
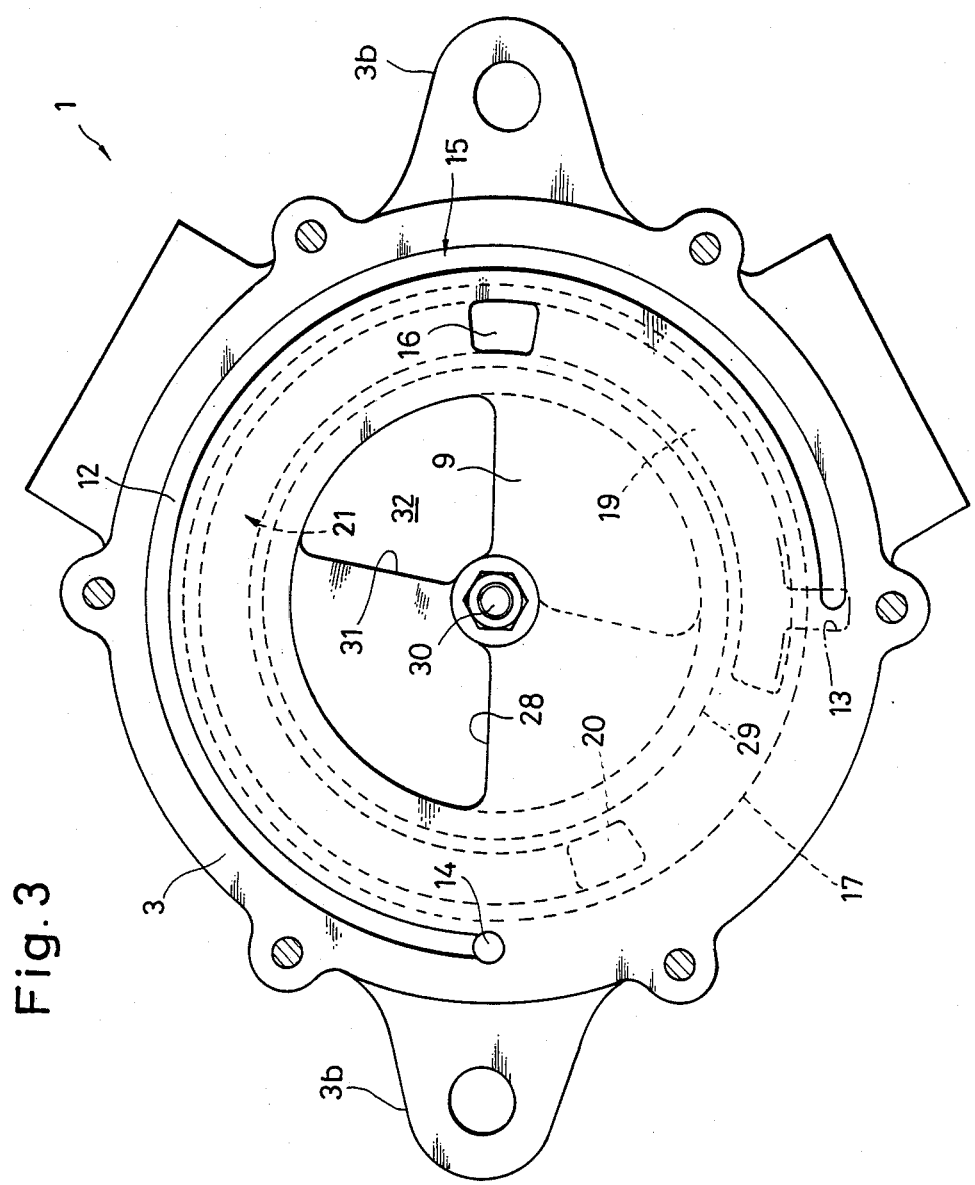
FIG. 3 is a horizontal section along line III—III of FIG. 1.

As shown in FIGS. 1 to 3, an arcuate narrow channel 12 is provided in a peripheral portion of the upper surface of the housing 3 to extend over substantially 270 degrees along the circumference of the latter. The upper end of the channel 12 is hermetically closed by that part of the bottom of the flange member 5 which is interposed between the seals 7 and 7. The channel 12 is communicated at one end to the main fluid chamber 10 by a notch 13 which is formed in a part of lower portions of the adjoining elastic member 2 and flange member 5. The other end of the channel 12 is communicated to the auxiliary fluid chamber 11 by a passageway 14 which is formed through a circumferential wall 3a of the housing 3. In this manner, the channel 12 constitutes a first orifice 15 for providing constant communication between the main and auxiliary fluid chambers 10 and 11. The first orifice 15 is provided with a sectional area which is small enough to exert great resistance to the fluid flowing therethrough. Specifically, the sectional area of the orifice 15 is such that when vibration of considerable amplitude such as a shake is applied to the engine mount 1, the orifice 15 sufficiently damps it.

Figure 4:
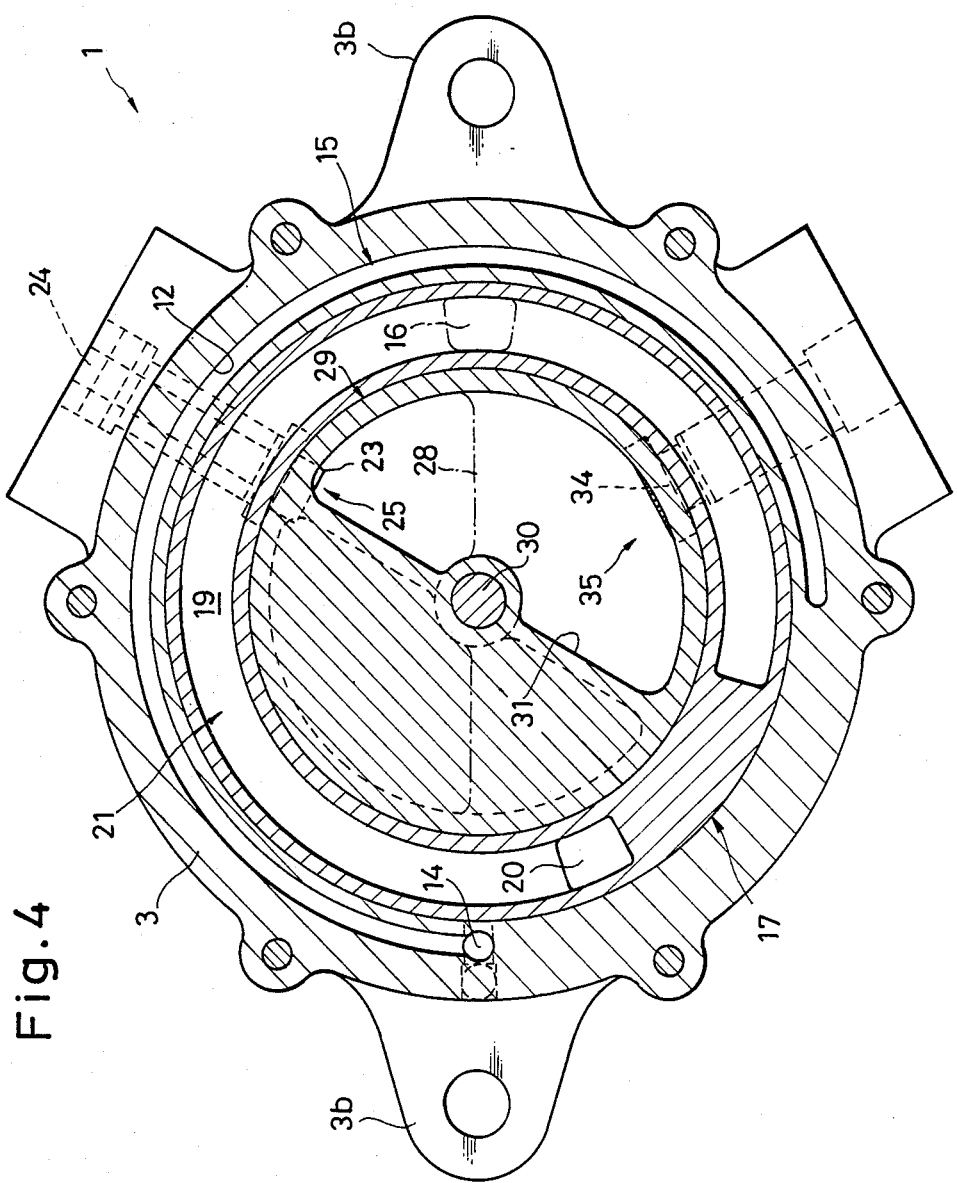
FIG. 4 is a horizontal section along line IV—IV of FIG. 1.

The lower surface of the partition 9 is so conditioned as to serve as a sealing surface along an outer peripheral part thereof. As shown in FIG. 3, an opening 16 which is greater in area than the first orifice 15 is formed through a part of the outer peripheral portion of the partition 9. As shown in FIGS. 1 and 4, a sufficiently thick movable ring 17 is provided on the lower surface of the partition 9 in such a manner as to contain the opening 16. Specifically, the circumferential wall 3a of the housing 3 is provided with a support plate 18 on its inner periphery, and the movable ring 17 is rotatable about a center axis supported by the support plate 18 and with its upper end held in close contact with the previously mentioned sealing surface of the partition 9. A channel 19 extends over substantially the whole circumferential dimension of the movable ring 17 except for a limited portion of the latter which is capable of closing the opening 16 of the partition 9 as needed, the channel 19 being open at its upper end. In this configuration, the channel 19 is closed by the partition 9 from the above and, when aligned with the opening 16 of the partition 9, communicated to the main fluid chamber 10. Further, the channel 19 is provided with an opening 20 through the bottom of its one end, providing communication between the channel 19 and the auxiliary fluid chamber 11.

Figure 5:
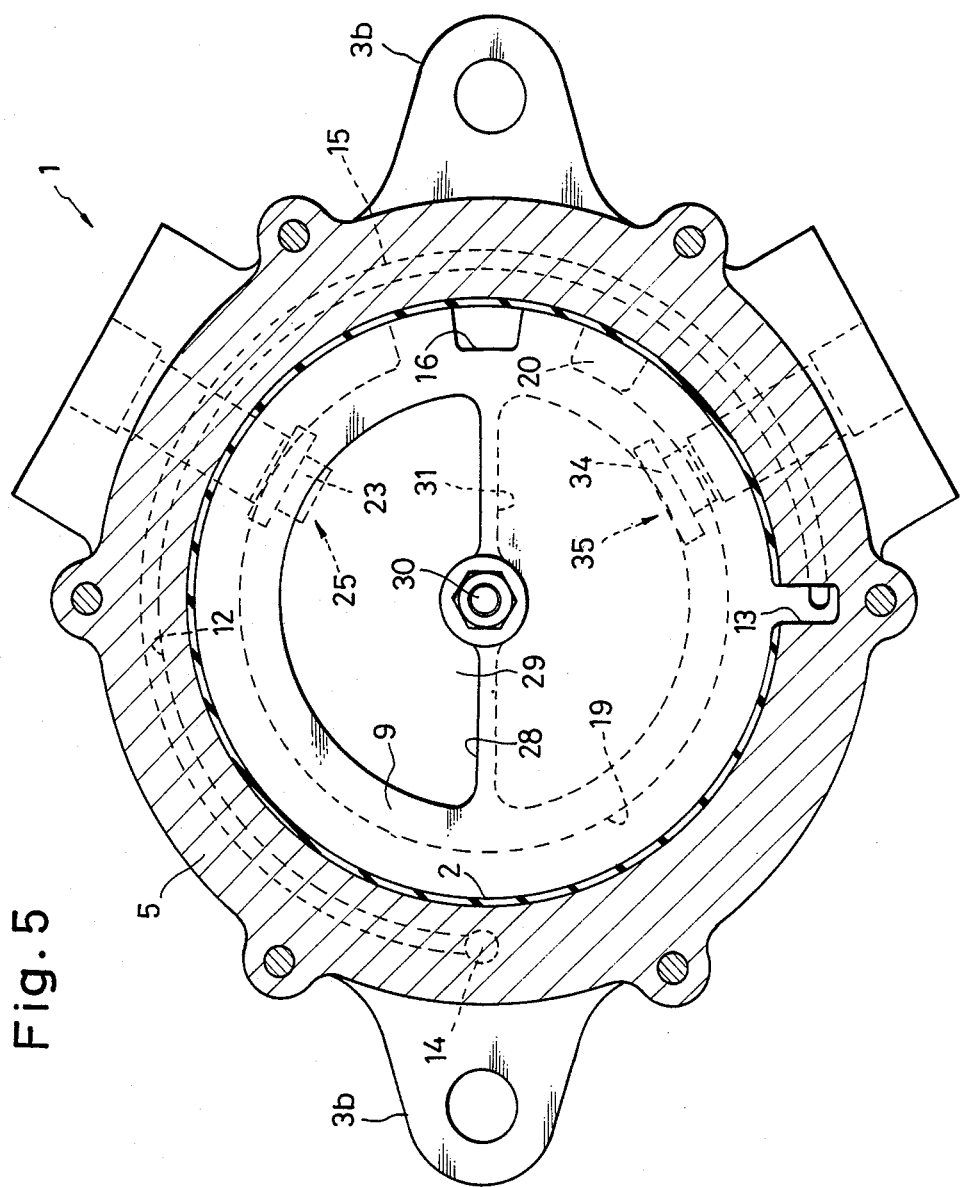
FIG. 5 is a view similar to FIG. 2, showing the engine mount in a different condition.

The above-described passageway implemented with the channel 19 functions as a second orifice 21 which also provides communication between the main auxiliary fluid chambers 10 and 11. The second orifice 21 is blocked when the movable ring 17 is rotated to align the channel 19 with the opening 16 of the partition 9, as shown in FIG. 2; it is unblocked when the ring 17 is rotated to interrupt the communication of the channel 19 and the opening 16, as shown in FIG. 5. While the channel 19 and the opening 16 are aligned with each other, the movable ring 17 is rotatable to change the length of the second orifice 21. The effective sectional area of the second orifice 21 is selected to be greater than that of the first orifice 15 and, therefore, to exert smaller resistance to the fluid flowing therethrough than the first orifice 15. Hence, a comparatively large amount of fluid is held in the second orifice 21 and, in response to low-frequency large-amplitude vibrations such as during idling, caused to resonate.

A ring gear 22 is provided on the lower surface of the movable ring 17 and held in constant mesh with a drive gear 23. An actuator motor, not shown, which is located outside of the housing 3 is drivably connected to the drive gear 23. As the drive gear 23 is driven by the actuator motor through a drive shaft 24, it in turn drives the movable ring 17 in a rotational motion. A first control device 25 is provided for opening and closing the second orifice 21 and controlling the length of the orifice 21 as stated above, by the movable ring 17 and its associated drive mechanism. The drive shaft 24 is rotatably supported by a guide tube 26 which is press-fitted in a bore that is formed throughout the wall 3a of the housing 3. A seal member 27 is provided between an outer end portion of the drive shaft 24 and the housing 3.

As shown in FIG. 3, a semicircular opening 28 is formed through a central part of the partition 9 and at diametrically one side thereof. The part of the underside of the partition 9 which surrounds the opening 28 is conditioned to serve as a sealing surface. As shown in FIGS. 1 and 4, a sufficiently thick movable disk 29 is provided on the underside of the partition 9 and radially inward of the movable ring 17. The movable disk 29 is supported by a support shaft 30 which is fixed to the center of the partition 9, in such a manner as to be rotatable about the shaft 30 with its top held in close contact with the sealing surface of the underside of the partition 9. An opening 31 identical in shape with the opening 28 of the partition 9 is formed through that part of the movable disk 29 which corresponds to the opening 28. Since the disk 29 has a substantial thickness as stated above, the opening 31 is comparatively long in the thicknesswise direction of the disk 29.

The opening 28 of the partition 9 and the opening 31 of the movable disk 29 in combination constitute a third orifice 32 which also provides communication between the main and auxiliary fluid chambers 10 and 11. The effective sectional area of the third orifice 32 is variable by rotating the disk 29 to change the positional relationship between the openings 28 and 31. As shown in FIG. 5, when the openings 28 and 31 are fully brought out in alignment, the third orifice 32 is fully blocked. On the other hand, when the openings 28 and 31 are fully aligned, the effective sectional area of the orifice 32 becomes so great that the fluid is allowed to flow therethrough without encountering any significant resistance. Specifically, the resistance exerted by the third orifice 32 is further smaller than that of the second orifice 21. Furthermore, a great amount of fluid is retained in the third orifice 32 and, in response to high-frequency small-amplitude vibrations such as during high-speed engine operation, caused to resonate.

A ring gear 33 is provided in a peripheral portion of the underside of the movable disk 29 and held in mesh with a drive gear 34. The ring gear 33 is rotatable driven by substantially the same drive mechanism as the one associated with the movable ring 17. The movable disk 29 and the drive mechanism therefor constitute a second control device 35 which is adapted to open and close the third orifice 32 while controlling its effective sectional area.

The first and second control devices 25 and 35 assigned to the second and third orifices 21 and 32, respectively, are independent of each other and driven by an exclusive actuator motor each. The actuator motors are individually operated by suitable control signals which are associated with engine speed, relative displacement of engine and vehicle body, etc.

The fluid-operated engine mount 1 having the above construction is selectively operable in two different modes as follows.

First, when importance is attached to vibration proof, a first mode is selected in which the second and third orifices 21 and 32 are opened and closed on the basis of engine speed. Specifically, while the vehicle is in an idling condition, the engine speed remains in a certain range. Under this condition, the control device 25 is operated by a signal representative of the engine speed to rotate the movable ring 17 until the channel 19 and the opening 16 of the partition 9 become aligned with each other. Simultaneously, the control device 35 is operated by the same signal to rotate the movable disk 29 until the opening 31 of the disk 29 becomes offset by 180 degrees from the opening 28 of the partition 9. Consequently, the second orifice 21 is opened, and the third orifice 32 is closed. It follows that the main and auxiliary fluid chambers 10 and 11 inside the engine mount 1 are communicated to each other by the first and second orifices 15 and 21.

During idling, the engine undergoes comparatively low-frequency high-amplitude vibrations. Such vibrations cause the elastic member 2 to deform by comparatively great amounts, thereby expanding and contracting the main fluid chamber 10. As a result, the fluid is displaced between the main and auxiliary fluid chambers 10 and 11, mainly through the second orifice 21 because the first orifice 15 exerts great resistance to the flow. The resonance of this fluid flowing through the second orifice 21 effectively absorbs the vibration of the vehicle.

Even in the idle speed range, the engine speed may be slightly changed due to idle-up, braking and other causes. To effectively absorb the resultant vibrations of different frequencies in the idle speed range, the movable ring 17 is rotated in response to the varying engine speed to vary the length of the second orifice 21 and, therefore, the resonant frequency of the fluid.

As the engine speed increases, the length of the second orifice 21 is reduced. On the increase of the engine speed beyond the idle range, the movable disc 29 is rotated based on the instantaneous engine speed so as to open the third orifice 32. Since the open area of the third orifice 32 is sufficiently large, the resistance to the fluid flowing through the orifice 32 is small enough to allow the fluid to move easily between the chambers 10 and 11. Consequently, the dynamic spring constant of the engine mount 1 is reduced to surely absorb vibrations of high frequencies. In this instance, the dynamic spring constant is variable with the overlapping degree of the opening 28 of the partition 9 and the opening 31 of the movable disk 29, so that vibrations of different high frequencies can be absorbed effectively by controlling the overlapping area of the openings 28 and 31.

In the manner described above, the engine mount 1 surely absorbs vibration over a wide frequency range which occurs during usual vehicle operation, i.e. from low frequencies to high frequencies.

When a shake and other vibrations of considerably great amplitudes are developed, a displacement sensor or an acceleration sensor delivers a signal representative of it to the second and third orifices 21 and 32 to close them. Alternatively, an arrangement may be made such that the occurrence of vibration of considerable amplitude is estimated by sensing a braking or a speed-changing operation to thereby close the second and third orifices 21 and 32. On closure of the orifices 21 and 32, communication between the main and auxiliary fluid chambers 10 and 11 is set up only by the first orifice 15 whose resistance to the flow is great. As a result, a great damping force acts on the fluid flowing between the two chambers 10 and 11, whereby the vibration of considerable amplitude is absorbed.

A second mode operation of the engine mount 1 is adapted to cope with a situation wherein engine vibrations during usual vehicle operation are not so critical and it is desired to absorb a shake and others due to vibrating forces of tires immediately. Specifically, during usual vehicle operation, the second and third orifices 21 and 32 are continuously closed. Under this condition, a shake or the like causes the fluid to flow between the main and auxiliary fluid chambers 10 and 11 through the first orifice 15 only, resulting that the vibration is damped immediately. That is, a rapid response to a shake and others is guaranteed.

As the vehicle is brought into an idling condition, an engine speed of that instant is sensed to open the second orifice 21 so that low-frequency high-amplitude vibrations inherent in the idling condition is absorbed. Again, the length of the second orifice 21 is adjusted on the basis of the engine speed to effectively absorb vibrations of various frequencies in the idle speed range.

Further, when the vehicle is rapidly accelerated, the third orifice 32 is opened responsive to an engine speed of that instant. This allows high-frequency vibrations caused by rapid acceleration to be absorbed.

As stated above, the engine mount 1 is usable in two different ways: one in which importance is attached to the absorption of vibrations which occur during usual vehicle operation, and the other in which importance is attached to the response to vibrations of the kind which is attributable to the conditions of a road surface. In both of the two cases, the first, second and third orifices 15, 21 and 32 having different sectional areas and lengths serve to absorb vibrations of various different natures, i.e., a shake and similar vibrations having considerable amplitudes, vibrations of low frequencies and great amplitudes occuring in an idling condition, and vibrations of high frequencies and small amplitudes occurring in a high-speed engine operation. In addition, the second orifice 21 having a sufficient length is controllable in length while the third orifice 32 having a large open area is controllable in effective sectional area, so that the engine mount 1 achieves precise control for effectively absorbing various kinds of vibrations.

While the present invention has been shown and described in relation to an engine mount for a motor vehicle, it is similarly applicable to, for example, a mount for a suspension.

What is claimed is:

1. A vibration preventing apparatus using a fluid, comprising:

an elastic member, rigidly connected at one end to a mounting member, for mounting said vibration preventing apparatus to a vibrating body, said elastic member at another end being rigidly connected to a mounting member for mounting said vibration preventing apparatus to a supporting body, said elastic member being deformable in response to vibrations of said vibrating body;

a main fluid chamber being at least partly defined by said eleastic member and having a volume which is varied by deformations of said elastic member;

an auxiliary fluid chamber fluidly communicating with said main fluid chamber by a first orifice, a second orifice and third orifice, said first orifice, being a fixed orifice having a predetermined length and predetermined sectional area, exerting a large resistance to a flow of the fluid which is confined in said main and auxiliary fluid chambers, said second orifice, having a variable effective flow path length, exerting a resistance smaller than the resistance of said first orifice, and said third orifice, having a variable effective path area, exerting a resistance which is smaller than the resistance of said second orifice, a volume of said auxiliary fluid chamber being varied by displacements of the fluid which are caused by changes in the volume of the main fluid chamber; and a first and a second control devices for opening and closing said second and third orifices respectively, said first and second control devices opening and closing said second and third orifices independently of each other.

2. A vibration preventing apparatus as claimed in claim 1, wherein the main and auxiliary fluid chambers are isolated from each other by a stationary partition, and a first and a second movable member each being movable in contact with said stationary partition;

the second orifice comprising an opening provided in the partition to communicate to the main fluid chamber, an opening provided in the first movable member to communicate to the auxiliary fluid chamber, and a passageway provided between said partition and said first movable member to communicate to said openings, said second orifice being varied in flow path length by movements of said first movable member;

the third orifice comprising openings having large areas each of which is provided in a respective one of the partition and second movable member, said third orifice being varied in effective path area by movements of said second movable member.

3. A vibration preventing apparatus as claimed in claim 2, wherein the first movable member comprises a ring which is supported rotatably relative to the partition, the second movable member comprising a disk which is received in a central opening of said first movable member and supported rotatably relative to said partition, said first and second movable members being rotated independently of each other by the first and second control devices, respectively.

4. A vibration preventing apparatus as claimed in claim 3, wherein the passageway included in the second orifice comprises a channel which extends in a circumferential direction of the ring, which constitutes the first movable member, the openings included in the partition and second movable member, which constitute the third orifice, being provided with a semicircular configuration each.

5. A vibration preventing apparatus as claimed in claim 3, wherein the disk which constitutes the second movable member is relatively thick so that the third orifice is provided with a substantial length.

6. A vibration preventing apparatus as claimed in claim 5, further comprising a first ring gear provided on an underside of the ring, which constitutes the first movable member, and a second ring gear provided in a peripheral part of an underside of the disk which constitutes the second movable member, said first and second movable members being driven by, respectively, a first and second drive gear which are meshed with said first and second ring gears.

7. A vibration preventing apparatus as claimed in claim 1, wherein the vibration preventing apparatus comprises an engine mount for a motor vehicle and is constructed such that in an idle engine speed range the second orifice is opened by the first during usual vehicle operation the third orifice is opened by the second control device, and on occurrence of vibration having a great amplitude the second and third orifices are closed by the first and second control devices, respectively.

8. A vibration preventing apparatus as claimed in claim 1, wherein the vibration preventing apparatus comprises an engine mount for a motor vehicle and is constructed such that during usual vehicle operation the second and third orifices are closed, during idling the second orifice is opened by the first control device, and during high-speed engine operation at least the third orifice is opened by the second control device.

* * * * *